United States Patent
Cuddihy et al.

(10) Patent No.: US 7,588,114 B2
(45) Date of Patent: *Sep. 15, 2009

(54) SEAT BELT RETRACTOR SYSTEM

(75) Inventors: Mark Cuddihy, New Boston, MI (US); Manoharprasad K. Rao, Novi, MI (US); Curtis Kalina, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,098

(22) Filed: Jan. 25, 2008

(65) Prior Publication Data

US 2008/0147279 A1  Jun. 19, 2008

Related U.S. Application Data

(62) Division of application No. 10/907,595, filed on Apr. 7, 2005, now Pat. No. 7,343,999.

(51) Int. Cl.
 *B60R 21/00* (2006.01)
(52) U.S. Cl. .......................... 180/268; 280/807; 701/45
(58) Field of Classification Search ................. 180/268; 280/807; 701/45; 242/390.8
See application file for complete search history.

(56) References Cited

U.S. PATENT DOCUMENTS

| | | |
|---|---|---|
| 3,931,866 A | 1/1976 | Takada |
| 4,321,979 A * | 3/1982 | Kuroyama et al. .......... 180/268 |
| 4,561,677 A | 12/1985 | Kawai |
| 4,572,543 A | 2/1986 | Tsuge et al. |
| 4,708,365 A | 11/1987 | Nakano et al. |
| 4,796,916 A | 1/1989 | Rogers et al. |
| 5,568,939 A | 10/1996 | Blackburn et al. |
| 5,571,253 A | 11/1996 | Blackburn et al. |
| 5,670,853 A | 9/1997 | Bauer |
| 6,332,629 B1 | 12/2001 | Midorikawa et al. |
| 6,485,057 B1 | 11/2002 | Midorikawa et al. |
| 6,572,048 B2 | 6/2003 | Yano et al. |
| 6,594,571 B2 | 7/2003 | Sakai et al. |
| 6,677,734 B2 | 1/2004 | Rothleitner et al. |
| 6,729,650 B2 | 5/2004 | Midorikawa et al. |
| 6,843,339 B2 | 1/2005 | Midorikawa et al. |
| 6,959,613 B2 | 11/2005 | Tobata |
| 6,997,277 B2 | 2/2006 | Midorikawa et al. |
| 6,997,474 B2 | 2/2006 | Midorikawa et al. |
| 2001/0004997 A1* | 6/2001 | Yano et al. ............... 242/390.8 |
| 2002/0140293 A1 | 10/2002 | Rothleitner et al. |
| 2003/0066923 A1 | 4/2003 | Peter |
| 2004/0108697 A1 | 6/2004 | Midorikawa et al. |
| 2009/0066072 A1* | 3/2009 | Odate ......................... 280/807 |

FOREIGN PATENT DOCUMENTS

| | | |
|---|---|---|
| EP | 0 195 268 B1 | 2/1986 |
| JP | 6286581 | 10/1994 |
| JP | 10278738 | 10/1998 |
| JP | 2002087210 | 3/2002 |

\* cited by examiner

*Primary Examiner*—Toan C To
(74) *Attorney, Agent, or Firm*—Frank MacKenzie; Brooks Kushman P.C.

(57) ABSTRACT

A seat belt retractor system for a vehicle having a vehicle safety system. The seat belt is retracted at a faster rate when a threat is detected using a high-voltage generated by a local power source.

20 Claims, 2 Drawing Sheets

SEAT BELT RETRACTOR SYSTEM

CROSS-REFERENCE TO RELATED APPLICATIONS

This application is a division of U.S. application Ser. No. 10/907,595, now U.S. Pat. No. 7,343,999, filed Apr. 7, 2005.

BACKGROUND OF THE INVENTION

1. Field of the Invention

The present invention relates to a seat belt retractor system for a motor vehicle.

2. Background Art

Motor vehicles include seat belts for securing vehicle occupants. A seat belt retractor system may be used to actuate a seat belt to eliminate slack. Actuation of the seat belt may be accomplished by use of an electric motor. More specifically, a constant amount of voltage may be provided to rotate the motor and retract the seat belt at a constant rate. Larger motors and 42 volt vehicle electrical systems have been proposed to more rapidly retract a seat belt. Larger motors are undesirable due to their size and cost. 42 volt electrical systems are undesirable due to increased costs, complexity, as well as the need to redesign the entire vehicle electrical system.

Before Applicants' invention, a seat belt retractor system was needed that could retract a seat belt at one or more increased rates. In addition, a seat belt retractor system and a method of control was needed that could provide faster actuation, yet be compatible with conventional vehicle electrical systems. In addition, a system and method was needed that employed standard components and did not require additional package space. In addition, a system and method that was needed that could be easily implemented in high volumes and be compatible with vehicle assembly operations. Problems associated with the prior art as noted above and other problems are addressed by Applicants' invention as summarized below.

SUMMARY OF THE INVENTION

In at least one embodiment of the present invention, a seat belt retractor system for a vehicle is provided. The vehicle includes a vehicle safety system configured to provide a signal. The seat belt retractor system includes a seat belt, a retractor mechanism, and a control circuit. The retractor mechanism is associated with the seat belt and has a motor. The control circuit controls operation of the motor and is connected to first and second voltage sources. The first voltage source provides less voltage than the second voltage source. The motor is driven by the second voltage source to retract the seat belt when the signal is provided.

DETAILED DESCRIPTION OF THE EMBODIMENT(S)

Figure 1:
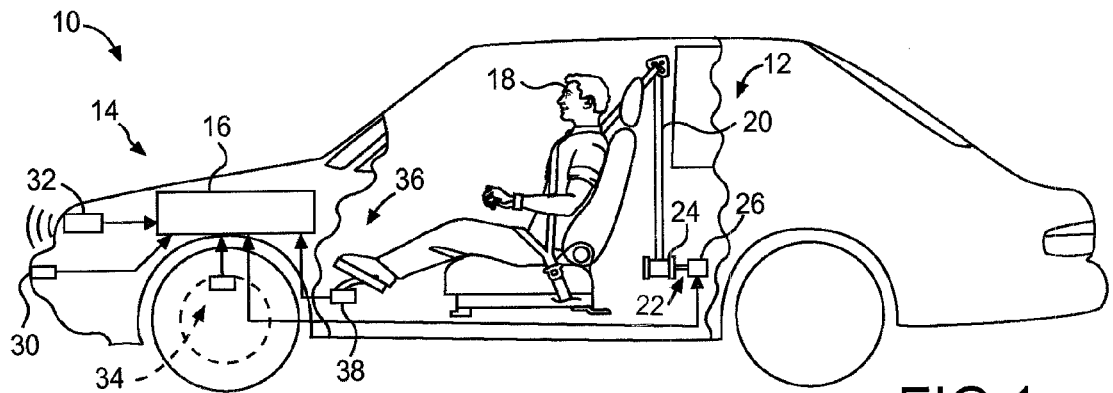
FIG. 1 is a schematic of a vehicle having a seat belt retractor system.

Referring to FIG. 1, a schematic of a vehicle 10 is shown. The vehicle 10 may be of any suitable type, such as a car or truck. The vehicle 10 may include a seat belt retractor pretensioner system 12, one or more vehicle safety systems 14, and one or more control modules 16.

The seat belt retractor pretensioner system 12 is configured to retract a seat belt to help secure a vehicle occupant 18. The seat belt retractor pretensioner system 12 may have any suitable configuration. In the embodiment shown, the seat belt retractor system pretensioner 12 includes a seat belt 20 and a retractor mechanism 22.

The seat belt 20 includes first and second ends. The first end may be attached to an anchor point disposed proximate the vehicle 10. The second end may be attached to the retractor mechanism 22.

The retractor mechanism 22 is disposed proximate the vehicle 10 and is adapted to selectively actuate the seat belt 20. In the embodiment shown, the retractor mechanism 22 includes a spool 24 and a motor 26.

The spool 24 receives the second end of the seat belt 20 and is adapted to rotate about an axis of rotation. More specifically, the seat belt 20 is protracted or unwound from the spool 24 when the spool 24 is rotated in a first direction and retracted or wound onto the spool 24 when rotated in a second or opposite direction.

The motor 26 is adapted to rotate the spool 24. The motor 26 may be of any suitable type, such as a DC motor. Moreover, the motor 26 may be configured with brushes, contacts, and/or internal wiring that are compatible with a conventional 12 volt vehicle electrical system and/or a higher level of voltage, such as a 42 volt voltage source.

Optionally, the retractor mechanism 22 may include various other devices to inhibit rotation of the spool 24. For example, the retractor mechanism 22 may include a ratchet associated with the spool 24 and a pawl adapted to engage the ratchet to inhibit rotation of the spool 24. In addition, a spring may be provided that provides a biasing force to retract the seat belt 20 when the motor 26 is not engaged.

The vehicle safety system 14 is adapted to predict or detect situations having an elevated likelihood of injury to a vehicle occupant 18. The vehicle safety system 14 may be of any suitable type, such as an impact detection system 30, a collision warning system 32, a vehicle dynamics system 34, and/or a vehicle braking system 36. Each vehicle safety system 14 may be adapted to activate the seat belt retractor pretensioner system 12 as well as other occupant protection systems, such as one or more front airbags, side airbags, side curtain airbags, or inflatable knee bolsters.

The impact detection system 30 may be adapted to detect a collision or impact with the vehicle 10. Impact detection systems may be utilized to deploy airbags to protect vehicle occupants. Such systems may employ a plurality of sensors that detect a front, side, or rear impact with the vehicle. For instance, the impact sensors may be adapted to detect load forces, pressure, or acceleration associated with a vehicle impact event. The impact sensors may be of any suitable type such as piezoelectric, piezoresistive, solid state, capacitive, or silicon micromachine devices.

The collision warning system 32 is configured to detect a potential collision or impact with the vehicle 10 before it occurs. The collision warning system 32 may be of any suitable type. For instance, the collision warning system may be radar, lidar, vision-based, or any combination of these technologies.

The vehicle dynamics system 34 is adapted to detect vehicle instability situations, such as a vehicle rollover or loss of tire pressure that may result in a vehicle rollover. For instance, the vehicle dynamics system 34 may be a rollover sensing system having a plurality of sensors that detect translation and/or rotation of the vehicle or a tire pressure monitoring system.

The vehicle braking system 36 is configured to engage vehicle brakes to reduce the velocity of the vehicle 10. The vehicle braking system 36 may include a brake pedal and a brake pedal position sensor 38. The brake pedal position sensor 38 may generate a signal indicative of the magnitude and/or rate of actuation of a brake pedal by the vehicle occupant 18. Brake pedal actuation having a sufficiently high rate and/or magnitude may be indicative of a potential vehicle impact or loss of control.

The control modules 16 are adapted to monitor and control the operation of various vehicle components and subsystems. For example, one or more control modules may control or communicate with the seat belt retractor pretensioner system 12 and the vehicle safety systems 14.

Figure 2:
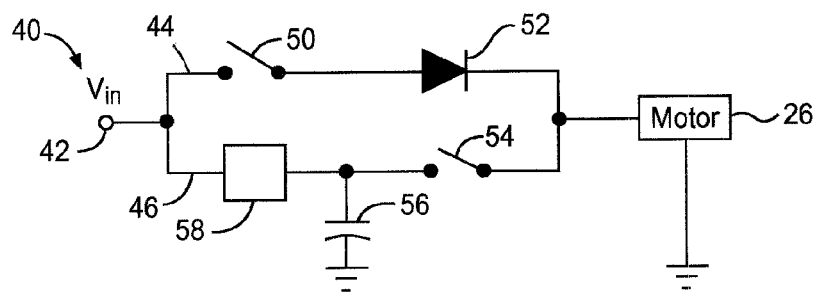
FIG. 2 is a schematic of one embodiment of a circuit diagram of a seat belt retractor system.
Figure 3:
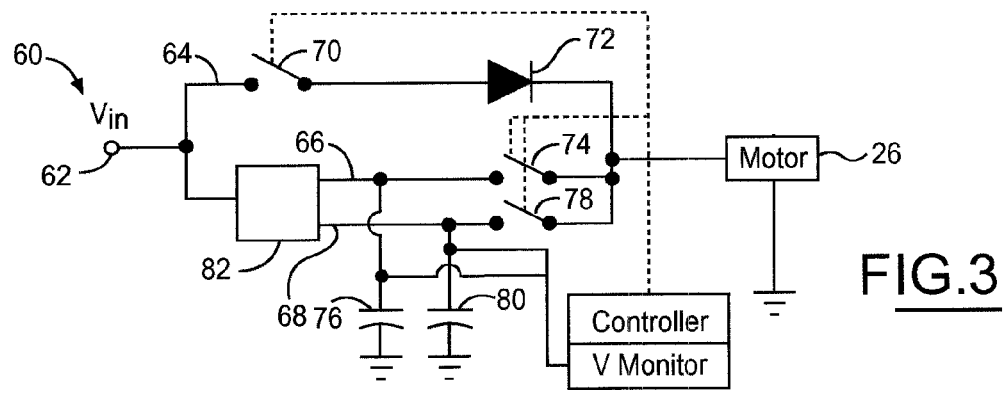
FIG. 3 is a schematic of another embodiment of a circuit diagram of a seat belt retractor system.

Referring to FIGS. 2 and 3, circuit diagrams are shown for the seat belt retractor pretensioner system 12. The circuits are configured to selectively provide different discrete voltage levels to the motor, thereby providing different motor speeds. The motor will operate at a higher speed when provided with a higher voltage, as long as the voltage provided is within the motor's operational limits. Higher motor speed will result in more rapid seat belt retraction.

Rapid seat belt retraction may be desirable in situations that may result in potential injury to a vehicle occupant. More specifically, rapid actuation of the seat belt may help prevent an occupant from moving out of position (e.g., closer to a window or interior trim panel). As a result, more time may be available to deploy an occupant protection device, such as an airbag. In addition, rapid seat belt actuation provides more time for a collision detection system to assess potential impact situations.

Referring to FIG. 2, one embodiment of a circuit diagram is shown. In this embodiment, voltage may be provided at a system voltage level or at a first elevated voltage level that exceeds the system voltage level to drive the motor. The circuit 40 is connected to a vehicle electrical system or first voltage source 42, designated $V_{in}$, that provides a nominal or system voltage level. For example, the nominal or system voltage level may be approximately 12 volts.

The circuit 40 may have any suitable configuration. In the embodiment shown, the circuit 40 includes first and second branches 44,46 that are configured to selectively provide voltage to the motor 26.

The first parallel branch 44 may include a first switch 50 and a diode 52. The first switch 50 may be any suitable type, such as a relay or transistor. Control logic may be used to control operation of the first switch 50 in a manner known by those skilled in the art.

The second parallel branch 46 may include a second switch 54 and a second voltage source 56. In addition, the second parallel branch 46 may include a voltage increasing device, such as a transformer or charge pump 58.

The second switch 54 may be of any suitable type, such as a relay or transistor. In one embodiment, a MOSFET (Metal Oxide Semiconductor Field Effect Transistor) is employed due to its appreciable current carrying capability, off-state voltage blocking capabilities, and low on-state voltage drop.

The second voltage source 56 is configured to provide a higher voltage level than the first voltage source 42. The second voltage source 56 may be of any suitable type. In the embodiment shown in FIG. 2, the second voltage source 56 is a capacitor. Alternatively, a battery or other voltage source may be employed.

The charge pump 58 may be adapted to provide a higher output voltage than the first voltage source 42. More specifically, the charge pump 58 is adapted to step up the input voltage ($V_{in}$) by a predetermined amount, such as by a factor of two or more. In the embodiment shown, the increased voltage is provided to charge the second voltage source 56 when the second switch 54 is open. Charging may be completed in a short period of time, such as within a few seconds. The charge pump 58 may not have sufficient current to drive the motor 26. In addition, the charge pump 58 may act as a current limiter to prevent activation of the motor 26 from drawing excess power from the vehicle electrical system, which would result in voltage drops in other parts of the vehicle 10.

Operation of the embodiment of the circuit shown in FIG. 2 will now be summarized. Voltage is provided to charge the second voltage source 56 and no voltage is provided to drive the motor when the first and second switches 50,54 are open. Voltage is provided to the motor 26 by the first voltage source 42 when the first switch 50 is closed and the second switch 54 is open. Voltage is provided to the motor 26 by the second voltage source 56 when the second switch 54 is closed. Moreover, the diode 52 inhibits power from flowing through the first branch 44 when the first and second switches 50,54 are closed.

Referring to FIG. 3, another embodiment of a circuit diagram is shown. In this embodiment, voltage may be provided at a system voltage level, a first elevated voltage level, or a second elevated voltage level to drive the motor at a low or "system" rate, an "intermediate" or first elevated rate, and a "high" or second elevated rate, respectively. Of course, the present invention also contemplates embodiments having any suitable number of additional voltage levels.

The circuit 60 shown in FIG. 3 includes a first voltage source 62 and first, second, and third branches 64,66,68 that are configured to selectively provide voltage to the motor 26. The first branch 64 includes a first switch 70 and a diode 72 like that shown in FIG. 2. The second branch 66 may include a second switch 74 and a second voltage source 76. Similarly, the third branch 68 may include a third switch 78 and a third voltage source 80. In the embodiment shown, the second and third voltage sources 76,80 are configured as capacitors.

Figure 4:
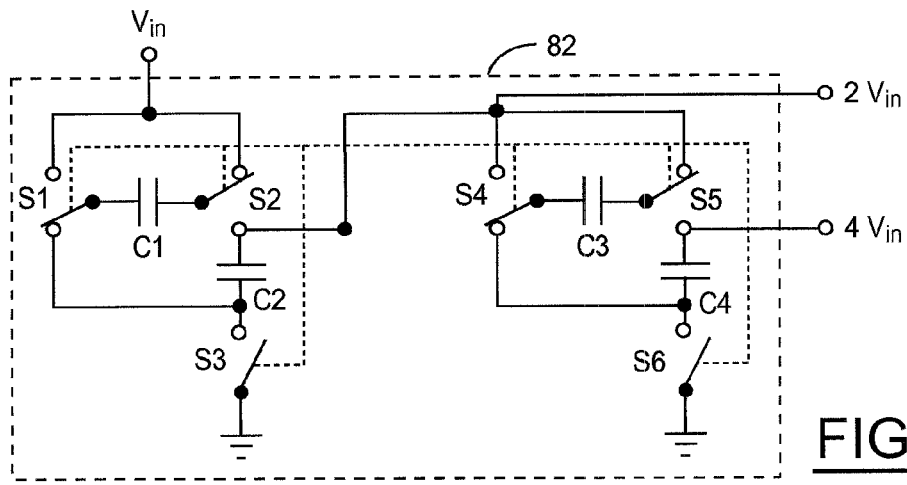
FIG. 4 is a schematic of an embodiment of a circuit diagram of a charge pump for the circuit shown in FIG. 3.

The second and third branches 66,68 may receive voltage from a circuit or device that provides a plurality of voltages, such as a charge pump 82. The charge pump 82 may have any suitable configuration. One exemplary embodiment of a charge pump 82 adapted to provide two output voltage levels is shown in FIG. 4. In this exemplary embodiment, the output voltages for the second and third branches are two times $V_{in}$ (designated "$2V_{in}$") and four times $V_{in}$ (designated "$4V_{in}$"), respectively. The operation of the charge pump involves alternately applying a negative charge to one side of a capacitor and a positive charge to the other side, effectively summing them together. In FIG. 4, the capacitor (C1) shuttles power to the "reservoir capacitor" (C2) which is typically much larger than C1 and holds the final charge. The switches alternate between the state shown (state 1) and an alternate state (state 2) in which all the switches are reversed from the positions shown in FIG. 4. Different output voltage levels may be provided by selecting appropriate circuit components in a manner known by those skilled in the art.

The first voltage source 62 provides a low or system voltage level. The second voltage source 76 may be configured to provide an intermediate or first elevated voltage level that is greater than the system voltage level. The third voltage source 80 may be configured to provide a high or second elevated voltage level that exceeds the first elevated (intermediate) voltage level provided by the second voltage source 76.

The second and third branches 66,68 may be connected to a voltage increasing device, such as a transformer or charge pump 82 that may provide different output voltages to the second and third branches 66,68. Alternatively, individual charge pumps that provide different output voltages may be associated with both the second and third branches 66,68.

Operation of the embodiment of the circuit shown in FIG. 3 will now be summarized. Voltage is provided to charge the second and third voltage sources 76,80 and no voltage is provided to drive the motor 26 when the second and third switches 74,78 are open. Voltage is provided to the motor 26 by the first voltage source 62 when the first switch 70 is closed and the second and third switches 74,78 are open. Voltage is provided to the motor 26 by the second voltage source 76 when the second switch 74 is closed and the third switch 78 is open. Voltage is provided to the motor 26 by the third voltage source 80 when the third switch 78 is closed. The diode 72 inhibits power from flowing through the first branch 64 when the first switch and the second or third switches 74,78 are closed.

Figure 5:
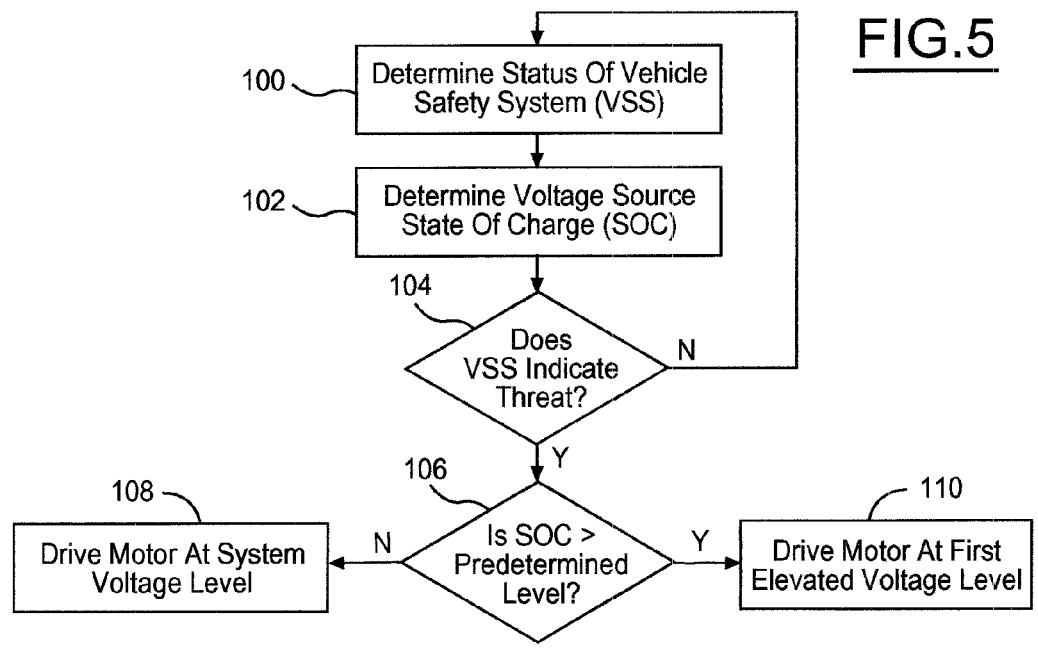
FIG. 5 is a flowchart of one embodiment of a method of controlling a seat belt retractor system.
Figure 6:
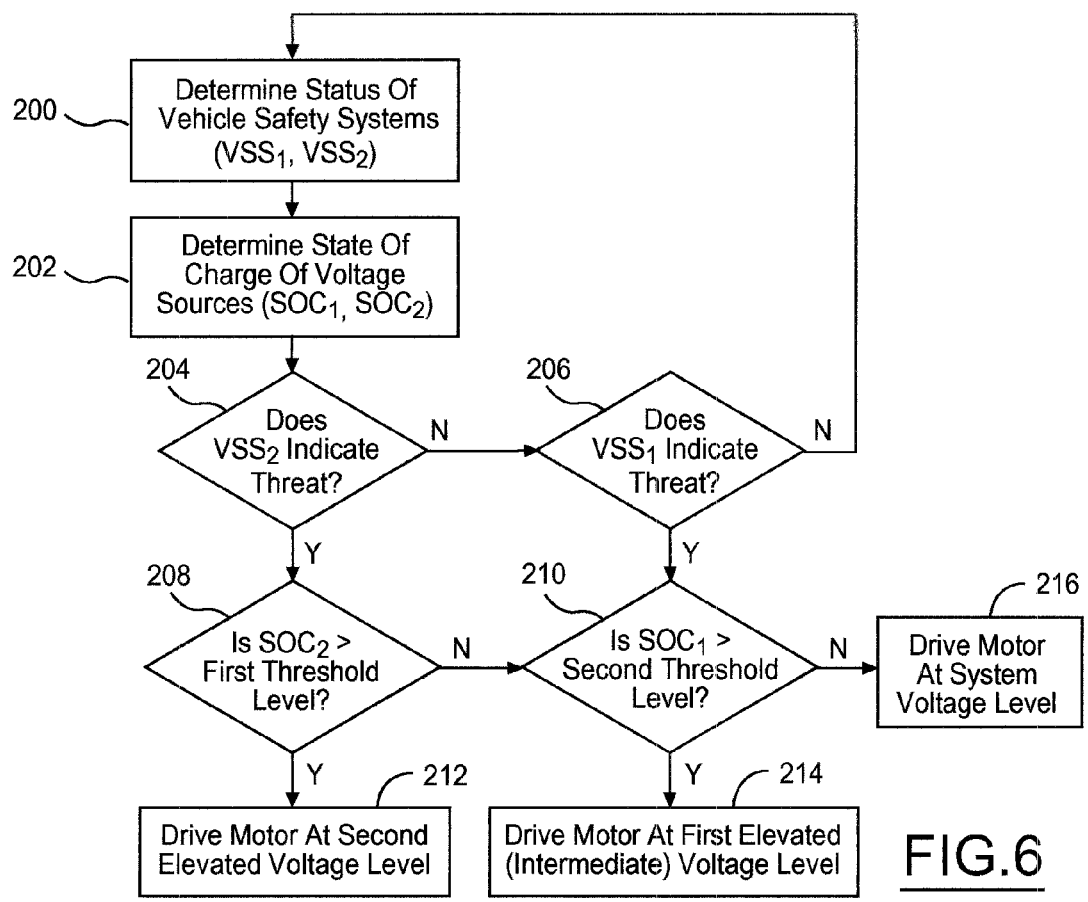
FIG. 6 is a flowchart of another embodiment of a method of controlling a seat belt retractor system

Referring to FIGS. 5 and 6, flowcharts depicting methods of controlling operation of a seat belt retractor system are shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Referring to FIG. 5, a first embodiment of the method will be described with reference to the circuit shown in FIG. 2.

At 100, the method begins by determining the status of one or more vehicle safety systems. A status signal may be provided by a safety system directly or via an associated control module. For example, a collision, potential collision, rollover, tire deflation, high brake actuation, or similar conditions may be indicated by the status signal.

At 102, a state of charge of a voltage source may be determined. For example, for the circuit shown in FIG. 2, the voltage available from the second voltage source 58 may be assessed. The voltage may be determined or derived using various types of sensors in a manner known by those skilled in the art. This step is optional and may be omitted in alternate embodiments of the present invention.

At 104, the status signal discussed in block 100 is evaluated using a threat assessment algorithm of any type to determine if there is a threat or situation that may result in potential injury to a vehicle occupant. For instance, the status signal may be communicated via a vehicle digital communication bus, such as high-speed CAN, to indicate a threat. If the status signal is not indicative of a threat, then the method returns to block 100. If the status signal is indicative of a threat, then the method continues at block 106.

At 106, the method may assess the voltage available from one or more voltage sources. More particularly, the state of charge of one or more voltage sources may be compared to a predetermined voltage level. The predetermined voltage level may be greater than system input voltage, $V_{in}$. This step is optional and may be omitted. If the state of charge is not greater than the predetermined voltage level, then the method continues at block 108. If the state of charge is greater than the predetermined voltage level, then the method continues at block 110.

At 108, the motor may be driven at a low or system voltage level. More particularly, the first switch 50 is closed to provide the system voltage to the motor. This step provides a safing function in that voltage is not provided by the second voltage source if the second voltage source is depleted or cannot otherwise provide a higher level of voltage than the system input voltage. As such, this step safeguards against situations in which the motor would be driven at a slower rate than the rate associated with the vehicle electrical system.

At 110, the motor is driven at a first elevated voltage level. More specifically, the second switch 54 may be closed to permit the second voltage source to power the motor at a higher voltage level than is available from the vehicle electrical system. The second switch 54 may remain closed for a predetermined period of time or may remain closed until stalling of the motor is detected. Motor stalling may be detected in various ways, such as by detecting current spikes or decreased rotation of the motor, or spool in a manner known by those skilled in the art.

Referring to FIG. 6, another embodiment of the method is shown. This embodiment may be employed with a vehicle having multiple vehicle safety systems. For convenience, this embodiment will be described with reference to the circuit shown in FIG. 3, which is configured to provide voltage at the system (low) voltage level, first elevated (intermediate) voltage level, and second elevated (high) voltage level to drive the motor. The present invention is scalable and also contemplates embodiments having additional voltage levels.

At 200, the method begins by determining the status of a plurality of vehicle safety systems or safety system groups. For convenience in reference, a first vehicle safety system or group of vehicle safety systems is designated $VSS_1$ and a second vehicle safety system or group of vehicle safety systems is designated $VSS_2$. Each safety system or group of vehicle safety systems may provide a status signal as described above with reference to block 100. For convenience in reference, the term "vehicle safety system" is used to designate a vehicle safety system or a vehicle safety system group.

The concept of vehicle safety system groups will now be described in greater detail. Different threats pose different potential risks to a vehicle or vehicle occupant. For instance, a high speed frontal impact may be associated with a higher likelihood of injury that a loss of tire pressure. Such threats may also be associated with different amounts of time available to take corrective or protective actions, such as retracting a seat belt or deploying an airbag. As a result, threats or situations having similar characteristics, such as available response time, may be organized into groups. Each group may include one or more situations or vehicle safety systems. For example, a low speed collision, predicted collision, loss of tire pressure, detection of a vehicle rollover, or high lateral acceleration forces may be members of a first group, while a high speed collision, a side impact event, or high level of brake actuation may be members of a second group. One skilled in the art will also recognize that different threat combinations or additional groups may be formed. Each group may be associated with a different seat belt retraction rate. For instance, the seat belt may be retracted at a fast rate if an event in the second group is detected and may be retracted at an intermediate rate if an event in the first group is detected.

At 202, the state of charge of one or more voltage sources may be determined. For example, in the circuit shown in FIG. 3, the voltage available from the second and third voltage sources 76,80 may be assessed as previously described. This step is optional and may be omitted in various alternate embodiments of the present invention.

At 204, the status of the second vehicle safety system or second safety system group, designated VSS$_2$, is evaluated in a manner similar to that described above with reference to block 104. For instance, a signal provided by the second vehicle safety system or each member of the second safety system group, designated a VSS$_2$ status signal, may be assessed. If the VSS$_2$ status signal is not indicative of a threat, then the method continues at block 206. If the VSS$_2$ status signal is indicative of a threat, then the method continues at block 208.

At 206, the status of the first vehicle safety system or first safety system group, designated VSS$_1$, is evaluated. The signal provided by the first vehicle safety system or each member of the first safety system group is designated the VSS$_1$ status signal. If the VSS$_1$ status signal is not indicative of a threat, then the method returns to block 200. If the VSS$_1$ status signal is indicative of a threat, then the method continues at block 210.

At 208, the state of charge of the voltage source 80 having the highest voltage (the third voltage source in the embodiment shown in FIG. 3) may be compared to an associated predetermined voltage level. Similar to block 202, this step is optional and may be omitted and the method may proceed directly to block 212. The predetermined voltage level associated with the third voltage source is greater than system input voltage, V$_{in}$. If the state of charge is not greater than the predetermined voltage level, then the method continues at block 210. If the state of charge is greater than the predetermined voltage level, then the method continues at block 212 where the third switch 78 is closed and the motor is driven at a fast rate. Moreover the step of driving the motor at a fast or second elevated rate may take precedence over a command to drive the motor at a lower rate, such as the first rate provided by the system voltage level or the first elevated rate provided by the first elevated (intermediate) voltage level discussed below in block 214. The third switch 78 may remain closed for a predetermined period of time or until stalling of the motor is detected.

At 210, the state of charge of the intermediate voltage source 76 (the second voltage source in the embodiment shown in FIG. 3) may be compared to a second predetermined voltage level. Similar to block 202, this step is optional and may be omitted. The second predetermined voltage level is greater than system input voltage (V$_{in}$) and less than the first predetermined voltage level associated with the third voltage source. If the state of charge is greater than the second predetermined voltage level, then the method continues at block 214 where the second switch 74 is closed and the motor is driven by the second voltage source at an intermediate rate. The second switch 74 may remain closed for a predetermined period of time or until stalling of the motor is detected. If the state of charge is not greater than the second predetermined voltage level, then the method continues at block 216 where the first switch 70 is closed and the motor is driven at a slow rate. Block 216 provides a safing function by providing the system input voltage when higher levels of voltages are not provided by the second and third voltage sources due to various reasons.

The present invention retracts the seat belt at a faster rate when such faster actuation is desirable. Otherwise, the seat belt is normally actuated as a slow rate so as not to potentially alarm or cause discomfort to the seat occupant. In addition, slow actuation occurs under less severe activation conditions to reduce stress on the motor, thereby increasing operational life and reliability.

While the best mode for carrying out the invention has been described in detail, those familiar with the art to which this invention relates will recognize various alternative designs and embodiments for practicing the invention as defined by the following claims.

What is claimed:

1. A seat belt retractor system for a vehicle having a vehicle safety system for providing a signal, the seat belt retractor system comprising:
   a seat belt;
   a retractor mechanism associated with the seat belt and having a motor; and
   a control circuit for controlling operation of the motor, the control circuit being connected to first and second voltage sources, the second voltage source being configured to provide a higher voltage level than the first voltage source;
   wherein the motor is driven by the second voltage source to retract the seat belt when the signal is provided.

2. The system of claim 1 wherein the second voltage source is charged by the first voltage source when the signal is not provided.

3. The system of claim 2 further comprising a charge pump connected to the first voltage source, the charge pump being configured to step up voltage provided by the first voltage source to charge the second voltage source.

4. The system of claim 3 wherein the first voltage source is associated with a vehicle electrical system and the charge pump acts a current limiter to inhibit drawing an increased level of current from the vehicle electrical system when the motor is driven by the second voltage source.

5. The system of claim 1 further comprising first and second vehicle safety systems adapted to provide first and second signals, respectively, wherein the control circuit provides voltage at a first elevated voltage level to drive the motor when the first signal is indicative of potential injury to the vehicle occupant and provides voltage at a second elevated voltage level to drive the motor when the second signal is indicative of potential injury to the vehicle occupant.

6. A seat belt retractor system for a vehicle having a vehicle safety system, comprising:
   a seat belt;
   a motor for retracting the seat belt;
   first and second voltage sources configured to power the motor;
   a first signal indicative of a state of charge of the second voltage source;

a second signal indicative of a status of the vehicle safety system; and a controller that determines whether to provide power to the motor with the first voltage source or the second voltage source to retract the seat belt based on the first and second signals.

7. The system of claim 6 wherein power is provided to the motor with the first voltage source when the state of charge of the second voltage source is less than a predetermined voltage level or the second signal is not indicative of a potential threat.

8. The system of claim 6 wherein power is provided to the motor with the second voltage source when the state of charge of the second voltage source is greater than a predetermined voltage level and the second signal is indicative of a potential threat.

9. The system of claim 8 wherein power is provided to the motor by the second voltage source for a predetermined period of time.

10. The system of claim 8 wherein power is provided to the motor by the second voltage source for a predetermined period of time or until stalling of the motor is detected.

11. The system of claim 6 wherein the second voltage source is charged with the first voltage source when the second signal is not indicative of a potential threat.

12. The system of claim 6 wherein the vehicle safety system is an impact detection system.

13. The system of claim 6 wherein the vehicle safety system is a collision warning system.

14. The system of claim 6 wherein the vehicle safety system is a vehicle dynamics system adapted to detect instability of the vehicle.

15. The system of claim 6 wherein the vehicle safety system is a vehicle brake system.

16. A seat belt retractor system comprising:

a seat belt;

a motor configured to actuate the seat belt;

a control circuit for controlling the motor; and first and second safety systems for generating first and second signals indicative of a status of the first and second safety systems, respectively;

wherein the motor is driven at a first elevated voltage level to retract the seat belt at a first elevated rate when the first signal is indicative a threat; and wherein the motor is driven at a second elevated voltage level to retract the seat belt at a second elevated rate when the second signal is indicative of a threat.

17. The system of claim 16 wherein the first elevated rate is less than the second elevated rate.

18. The system of claim 16 wherein the motor is driven at the first or second elevated voltage levels for a predetermined period of time or until stalling of the motor is detected.

19. The system of claim 16 wherein the seat belt retractor system further comprises a first voltage source, wherein the motor is driven at the second elevated voltage level when a state of charge of the first voltage source exceeds a predetermined voltage level.

20. The system of claim 16 wherein the seat belt retractor system further comprises first and second voltage sources, wherein the first voltage source is charged by the second voltage source when the first and second signals are not indicative of the threat.

* * * * *